(12) United States Patent
Zhang

(10) Patent No.: US 11,233,948 B2
(45) Date of Patent: Jan. 25, 2022

(54) EXPOSURE CONTROL METHOD AND DEVICE, AND ELECTRONIC DEVICE

(71) Applicant: Guangdong Oppo Mobile Telecommunications Corp., Ltd., Guangdong (CN)

(72) Inventor: Gong Zhang, Guangdong (CN)

(73) Assignee: SHENZHEN HEYTAP TECHNOLOGY CORP., LTD., Shenzhen (CN)

( * ) Notice: Subject to any disclaimer, the term of this patent is extended or adjusted under 35 U.S.C. 154(b) by 0 days.

(21) Appl. No.: 16/546,879

(22) Filed: Aug. 21, 2019

(65) Prior Publication Data

US 2020/0068112 A1 Feb. 27, 2020

(30) Foreign Application Priority Data

Aug. 22, 2018 (CN) .......................... 201810962790.X

(51) Int. Cl.
*H04N 5/235* (2006.01)
*H04N 5/232* (2006.01)
*G06T 7/00* (2017.01)

(52) U.S. Cl.
CPC ......... *H04N 5/2353* (2013.01); *G06T 7/0002* (2013.01); *H04N 5/2351* (2013.01);
(Continued)

(58) Field of Classification Search
None
See application file for complete search history.

(56) References Cited

U.S. PATENT DOCUMENTS

| 2007/0019937 A1 | 1/2007 | Endo |
| 2009/0051783 A1* | 2/2009 | Kim ................... H04N 5/23222 348/229.1 |

(Continued)

FOREIGN PATENT DOCUMENTS

| CN | 101241294 A | 8/2008 |
| CN | 103051841 A | 4/2013 |

(Continued)

OTHER PUBLICATIONS

English translation of Notice of Allowance for CN application 201810962790.X dated May 15, 2020.

(Continued)

*Primary Examiner* — Mark T Monk
(74) *Attorney, Agent, or Firm* — Young Basile Hanlon & MacFarlane, P.C.

(57) ABSTRACT

The disclosure provides an exposure control method, an exposure control device, an electronic device and a computer readable storage medium. The method includes: determining a target exposure for an image to be captured based on ambient light luminance; determining an exposure time for the image to be captured based on the target exposure and a preset photo-sensibility for the image to be captured; in response to determining that the exposure time for the image to be captured is greater than an upper limit, updating the exposure time for the image to be captured based on the upper limit; and performing an exposure control based on the exposure time and the photo-sensibility for the image to be captured.

17 Claims, 5 Drawing Sheets

(52) U.S. Cl.
CPC ..... *H04N 5/23222* (2013.01); *H04N 5/23245* (2013.01); *H04N 5/23251* (2013.01)

(56) References Cited

U.S. PATENT DOCUMENTS

| | | | |
|---|---|---|---|
| 2009/0160968 A1 | 6/2009 | Prentice et al. | |
| 2013/0063618 A1 | 3/2013 | Miyazaki | |
| 2013/0194447 A1 | 8/2013 | Sudo et al. | |
| 2013/0215314 A1* | 8/2013 | Prentice | H04N 5/2352 348/333.11 |
| 2013/0300886 A1* | 11/2013 | Nakayama | H04N 5/23245 348/216.1 |
| 2013/0308032 A1* | 11/2013 | Terashima | H04N 1/215 348/333.11 |

FOREIGN PATENT DOCUMENTS

| | | |
|---|---|---|
| CN | 103841324 A | 6/2014 |
| CN | 105141853 A | 12/2015 |
| CN | 105227853 A | 1/2016 |
| CN | 106375676 A | 2/2017 |
| CN | 107613190 A | 1/2018 |
| CN | 107613191 A | 1/2018 |
| CN | 107613219 A | 1/2018 |
| CN | 107615744 A | 1/2018 |
| CN | 108111741 A | 6/2018 |
| CN | 108337443 A | 7/2018 |
| CN | 109151333 A | 1/2019 |
| CN | 110072051 A | 7/2019 |
| JP | 2010171825 A | 8/2010 |
| JP | 2016019076 A | 2/2016 |
| JP | 6238732 B2 | 11/2017 |
| WO | 2018010411 A1 | 1/2018 |

OTHER PUBLICATIONS

Search report for EP application 19192723.5 dated May 29, 2020.
Partial European Search Report for European Application No. 19192723.5 dated Jan. 27, 2020.
International search report issued in corresponding international application No. PCT/CN2019/101547 dated Nov. 18, 2019.
OA with English translation for CN application 201810962790.X dated Sep. 26, 2019.
India Examination Report for IN Application 201914033517 dated Mar. 23, 2021.

* cited by examiner

US 11,233,948 B2

EXPOSURE CONTROL METHOD AND DEVICE, AND ELECTRONIC DEVICE

CROSS-REFERENCE TO RELATED APPLICATION(S)

This application claims priority to Chinese Patent Application No. 201810962790.X, filed on Aug. 22, 2018, the entire content of which is incorporated herein by reference.

TECHNICAL FIELD

The present disclosure relates to a field of imaging technologies, and more particular to an exposure control method and device, an electronic device and a computer readable storage medium.

BACKGROUND

With the development of smart terminal technology, a mobile terminal device (such as smart phone, tablet computer, etc.) is more and more popularized. Most of the mobile terminal devices are provided with a built-in camera. With the enhancement of a processing capacity of the mobile terminal and the development of camera technology, performances of the built-in camera are becoming stronger and stronger, and image quality is getting higher and higher. Nowadays, the mobile terminal device is operated simply and is portable. In daily life, more and more users use the mobile terminal device, such as a smart phone and a tablet, to take pictures.

SUMMARY

A first aspect of the present disclosure provides an exposure control method. The method includes determining a target exposure for an image to be captured based on ambient light luminance; determining an exposure time for the image to be captured based on the target exposure and a preset photo-sensibility for the image to be captured; in response to determining that the exposure time for the image to be captured is greater than an upper limit, updating the exposure time for the image to be captured based on the upper limit; and performing an exposure control based on the exposure time and the preset photo-sensibility for the image to be captured.

Another aspect of the present disclosure provides one or more non-volatile computer readable storage medium having a computer executable instruction. When the computer executable instruction is executed by one or more processors, the one or more processors are configured to execute an exposure control method described above.

A yet another aspect of the present disclosure provides an electronic device, including a memory and a processor. The memory is configured to store a computer readable instruction, when the computer readable instruction is executed by a processor, an exposure control method described above.

Additional aspects and advantages of embodiments of the present disclosure will be given in part in the following descriptions, become apparent in part from the following descriptions, or be learned from the practice of the embodiments of the present disclosure.

BRIEF DESCRIPTION OF DRAWINGS

The above and/or additional aspects and advantages of the present disclosure may become apparent and readily to be understood from descriptions made to embodiments in combination with drawings, in which.

DETAILED DESCRIPTION

Figure 1:
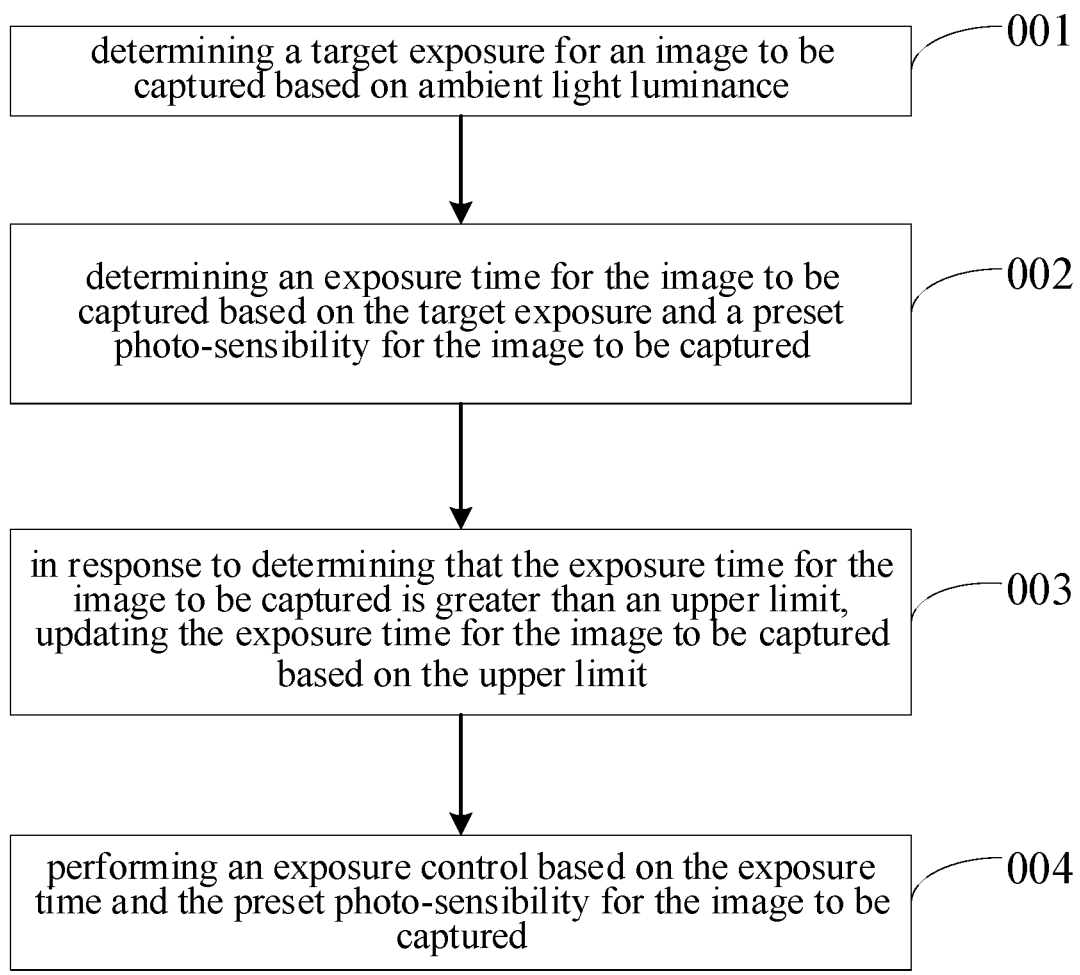
FIG. 1 is a schematic flowchart illustrating an exposure control method according to embodiments of the present disclosure.

Embodiments of the present application will be described in detail below. Examples of the embodiments are illustrated in drawings, in which throughout the present disclosure, same or similar reference numerals are used to represent same or similar elements or elements having same or similar functions. The embodiments described below with reference to the accompanying drawings are intended to be illustrative and to explain the present disclosure, and are not construed as limiting.

In related arts, with the popularity of smart mobile terminals, while the smart mobile terminal brings convenience to taking pictures in people's daily life, a requirement on image quality of a photographed image is increased by the user. However, due to limited professional skills, it is difficult for the user to set an appropriate capturing parameter according to the capturing scene. As a result, it is difficult to capture an image as good as that captured with a professional camera by a professional person. Especially in a special scene, such as a night scene, the image quality is low.

In addition, for a mobile terminal device having a relatively small aperture, when the image is captured at low ambient light luminance in a night scene, an artifact may be generated in the image captured due to shake in case where an exposure time is increased for the image to be captured to improve the light luminance. In case where a photo-sensibility value is increased to capture the image, noise may be introduced during the imaging, resulting in blurring of the image. As a result, the image captured in the night scene not only has low dynamic range and low brightness, but also has high noise. In addition, the image is prone to ghosting and blurring, affecting the user experience.

In view of the above, embodiments of the present application provide an exposure control method. The method includes the following. A target exposure for an image to be captured is determined based on ambient light luminance. An exposure time for the image to be captured is determined based on the target exposure and a preset photo-sensibility for the image to be captured. When the exposure time for the image to be captured is greater than an upper limit, the exposure time for the image to be captured is updated based on the upper limit. An exposure control is performed based on the exposure time and the preset photo-sensibility for the image to be captured.

The exposure control method and device according to embodiments of the present disclosure may be described with reference to drawings.

FIG. 1 is a schematic flowchart illustrating an exposure control method according to embodiments of the present disclosure.

The exposure control method according to embodiments of the present disclosure is applicable to an electronic device. The electronic device may be a hardware device having various operation systems and an imaging device, such as a phone, a tablet computer, a personal digital assistance, a wearable device and the like As illustrated in FIG. 1, the exposure control method may include the following.

At block 001, a target exposure for an image to be captured is determined based on ambient light luminance.

At block 003, an exposure time for the image to be captured is determined based on the target exposure and a preset photo-sensibility for the image to be captured.

At block 005, in response to determining that the exposure time for the image to be captured is greater than an upper limit, the exposure time for the image to be captured is updated based on the upper limit.

At block 007, an exposure control is performed based on the exposure time and the preset photo-sensibility for the image to be captured.

Figure 2:
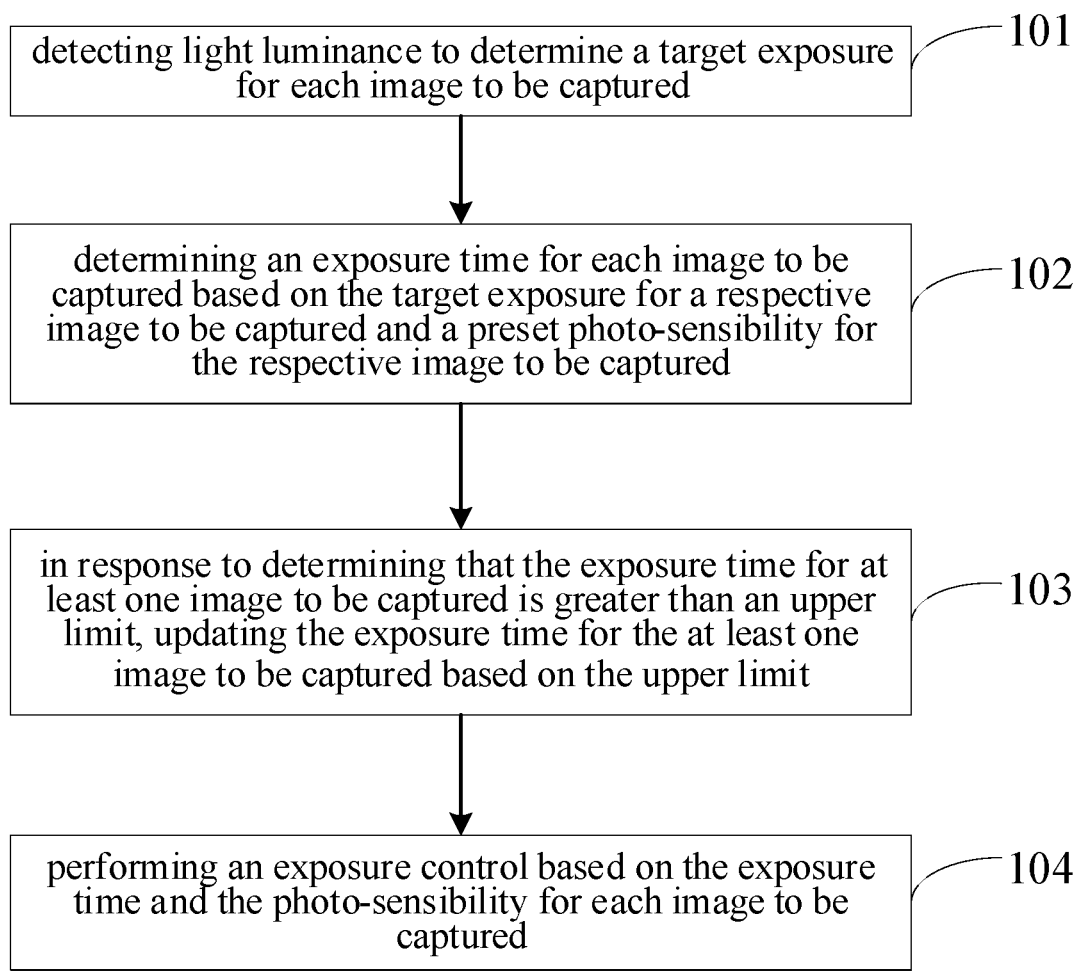
FIG. 2 is a schematic flowchart illustrating another exposure control method according to embodiments of the present disclosure.

FIG. 2 is a schematic flowchart illustrating another exposure control method according to embodiments of the present disclosure.

As illustrated in FIG. 2, the exposure control method may include the following.

At block 101, light luminance is detected to determine a target exposure for each image to be captured.

The term "exposure" refers to an amount of light received by a photosensitive element of an imaging device within an exposure time. The exposure is related to an aperture size, the exposure time and a photo-sensibility. The term "aperture size" refers to a beam diameter, for determining an amount of passing light within a unit time. The term "exposure time" refers to a time duration when the light passes through a lens. The term "photo-sensibility", also called as ISO value, is an indicator of the photo-sensibility of a negative to light, for indicating a speed of sensing light by the photosensitive element. A high ISO value means a strong photo-sensibility of the photosensitive element.

It should be explained that, when the photo-sensibility of the imaging device is low, longer exposure time is required to achieve a same imaging effect to that with a high photo-sensibility. The photo-sensibility of a digital camera is an indicator, like a film sensitivity. The ISO value of the digital camera may be adjusted based on a sensitivity of the photosensitive element or by combining photosensitive points. In other words, the ISO value may be increased by improving the light-sensibility of the photosensitive element or by combining adjacent photosensitive points. Certainly, in order to reduce the exposure time, a relatively high photo-sensibility may cause much noises, thereby decreasing the image quality. Therefore, in the night scene, in order to achieve a perfect noise-suppression effect, it is desired to set a low photo-sensibility, such as 100ISO or 200ISO, while increasing the exposure time, i.e. shutter time, since the aperture size of the electronic device, such as the phone, is fixed.

In detail, a preview image of a current capturing scene may be acquired by the imaging device. The preview image is displayed on a display screen of the imaging device for viewing by the user. The preview image may be processed to determine the ambient light parameters and control parameters of the imaging device. Ambient light luminance of each part of the preview image may be detected by a photosensitive element. A base exposure may be determined based on light luminance corresponding to the preview image. When the aperture is fixed, the base exposure may include a base exposure time and a base photo-sensibility.

In some examples, the term "base exposure" refers to a determined exposure that is matched to the ambient light luminance of the current capturing scene. The ambient light luminance of the current capturing scene is obtained by detecting the light luminance when obtaining the preview image. A value of the base exposure may be a product of the base photo-sensibility and the base exposure time.

The term "base photo-sensibility" may be a photo-sensibility matched to a current shake degree based on the current shake degree of the imaging device. Further, the photo-sensibility may be obtained by detecting the light luminance. The determination of the photo-sensibility is not limited in the present disclosure. It may be understood that, since the exposure and the photo-sensibility may affect an entire capturing time duration, the shake degree of the imaging device may be increased during capturing an image by a hand-held imaging device when the entire capturing time duration is long, thereby affecting the image quality. Therefore, based on the current shake degree of the imaging device, the base photo-sensibility may be determined such that the entire capturing time duration is limited within a suitable range.

In detail, the exposure is related to the aperture size, the exposure time and the photo-sensibility. Given a fixed aperture size, the base exposure time may be determined based on the base exposure and the base photo-sensibility. The base exposure time may be set as EV0, the target exposure for each image to be captured may be determined based on the preset exposure compensation value for each image to be captured.

The preset exposure compensation value refers to an exposure value (EV) set in advance based on the ambient light luminance of the current capturing scene. In an initial definition of the exposure value, the exposure value is not a specific value, but refers to "a combination of all apertures and all exposure time that may provide a uniform exposure". The photo-sensibility, the aperture size and the exposure time together determine the exposure. Different combinations of these parameters may yield the same exposure. That is, the EVs for these combinations are same to each other. For example, with a same photo-sensibility, the exposure determined by the combination of the exposure time of $\frac{1}{125}$ second and the aperture size of f11 is same to the exposure determined by the combination of the exposure time of $\frac{1}{250}$ second and the shutter time of f8, i.e., the EVs are same. The EV value equaling to 0 refers to the exposure obtained with the photo-sensibility of 100, F-number of f1, and the exposure time of 1 second. When the exposure time is increased by 1 level (that is, the exposure time is doubled), or the photo-sensibility is doubled, or the aperture size is doubled, the EV value is added by 1. That is, the exposure corresponding to EV1 is twice of the exposure corresponding to EV0.

As an example, when the base exposure for each image to be captured is determined by the imaging device as 400 based on the brightness information of the preview image and the base photo-sensibility ISO value is 100, the base exposure time may be 4 s. When the preset exposure compensation value for each image to be captured is EV+1, it may be determined that the target exposure is 800. The exposure compensation value of EV+1 may refer to adding the exposure by 1 level. The exposure corresponds to data of light luminance detected by the imaging device. In other words, an actual exposure is twice of the exposure corresponding to the data of light luminance detected.

In an example, when the preset exposure compensation value is set, the EV value corresponding to the base exposure may be preset as 0. EV+1 means that the exposure is added by 1 level, such that the exposure is twice of the base exposure. EV+2 means that the exposure is added by 2 level, such that the exposure is four times of the base exposure. EV-1 means that the exposure is reduced by 1 level, such that the exposure is haft of the base exposure.

For example, when 7 images are to be captured, the preset exposure compensation values may be [+1, +1, +1, +1, 0, -3, -6] corresponding to the 7 images to be captured. With the image captured with the preset exposure compensation value of EV+1, a problem of noise may be avoided by performing a noise reduction operation in time domain on the image having high brightness, to suppress the noise while achieving good darkness details. With the image captured with the preset exposure compensation value of EV-6, a problem of overexposure caused by high light luminance may be avoided to maintain highlight details. With the images captured with the preset exposure compensation values EV0 and EV-3, a transition between the highlight part and the darkness part may be maintained, to ensure a good highlight-to-darkness transition.

At block 102, an exposure time for each image to be captured may be determined based on the target exposure for a respective image to be captured and a preset photo-sensibility for the respective image to be captured.

In an example, as a possible implementation, when the preset photo-sensibility for each image to be captured is same to each other, the preset photo-sensibility for each image to be captured may be determined based on the ambient light luminance of the capturing scene. When the ambient light luminance is low, increasing the photo-sensibility may shorten the shutter time, thereby reducing affect caused by the shake.

As another possible implementation, when the preset photo-sensibility for each image to be captured is same to each other, the preset photo-sensibility may be determined for each image to be captured based on a shake degree of the imaging device.

In detail, in order to determine the shake degree, displacement information may be collected by a displacement sensor provided in the imaging device. Therefore, based on the displacement information of the imaging device, the shake degree of the imaging device may be determined. When the shake degree of the imaging device is greater than or equal to a shake threshold, it is determined that the preset photo-sensibility for each image to be captured equals to a first photo-sensibility value in the current capturing scene. When the shake degree of the imaging device is less than the shake threshold, it is determined that the preset photo-sensibility for each image to be captured equal to a second photo-sensibility value in the current capturing scene. The shake threshold is preset for determining the preset photo-sensibility by the imaging device.

The first photo-sensibility value is greater than the second photo-sensibility value. The first photo-sensibility value may be a preset multiple of the second photo-sensibility value. The preset multiple may be greater than or equal to 2. As a possible implementation, in order to reduce the noise, the second photo-sensibility value may be a minimal photo-sensibility of the imaging device, i.e., the second photo-sensibility value may be equal to 100ISO. Accordingly, the first photo-sensibility value may equal to 200, 400, 800 or higher.

Since the exposure is a product of the photo-sensibility and the exposure time, in examples of the present disclosure, the exposure time for each image to be captured may be determined based on the target exposure for the respective image to be captured and the photo-sensibility for the respective image to be captured.

As an example, when the target exposure for an image to be captured is determined as 800 by detecting the light luminance, and the photo-sensibility for that image to be captured is 400ISO, the exposure time for that image to be captured is 2 s. In this way, the exposure time for each image to be captured may be determined.

At block 103, when the exposure time for at least one image to be captured is greater than an upper limit, the exposure time for at least one image to be captured is updated based on the upper limit.

As a possible implementation, in examples of the present disclosure, the upper limit of the exposure time for each image to be captured may be determined based on the shake degree of the imaging device.

In detail, in order to determine the shake degree, the displacement information may be collected by the displacement sensor provided in the imaging image. Further, the shake degree of the imaging device may be determined based on the displacement information of the imaging device. When the shake degree of the imaging device is greater than or equal to the shake threshold, it is determined that the upper limit of the exposure time for each image to be captured is a first exposure time in the current capturing scene. When the shake degree of the imaging device is less than the shake threshold, it is determined that the upper limit of the exposure time for each image to be captured is a second exposure time. The shake threshold is preset for determining the preset photo-sensibility by the imaging device.

The first exposure time is less than the second exposure time. The first exposure time may range from 150 milliseconds (ms) to 300 ms. The second exposure time may range from 4.5 seconds (s) to 5.5 s.

In examples of the present disclosure, when the exposure time for at least one image to be captured is greater than the upper limit, the exposure time for the at least one image to be captured may be set to the upper limit. Further, the photo-sensibility for the at least one image to be captured may be updated based on the target exposure for the at least one image to be captured, the upper limit and a relationship among the exposure, the photo-sensibility and the exposure time. The exposure time for the at least one image to be captured may be updated based on the upper limit.

As an example, the upper limit ranges from 150 ms to 300 ms. There are 7 images to be captured. The exposure time for each image to be captured may be determined as 400 ms, 400 ms, 400 ms, 400 ms, 200 ms, 180 ms, and 280 ms, based on the target exposure for each image to be captured and the preset photo-sensibility for each image to be captured. Therefore, 4 images to be captured correspond to the exposure time of 400 ms which is greater than the upper limit. The exposure time for each of the 4 images to be captured may be updated to 300 ms.

It may be understood that, when the exposure time for at least one image to be captured is greater than the upper limit, it is possible that the entire capturing time is long, and the capturing is easily suffered from the shake of the imaging device, such that the artifact caused by the shake may be presented in the captured image and the captured image may be blurred. When the exposure time for each image to be captured is less than a preset lower limit, the noise may be too large to be reduced.

Therefore, after the exposure time is determined for each image to be captured, each exposure time may be compared with a preset time range, to determine whether the exposure time for each image to be captured is within the preset time range. When the exposure time for a certain image to be captured is less than a lower limit set for the first time value, the exposure time for the certain image to be captured may be set to the lower limit set for the first time value, such as 150 ms. When the exposure time for a certain image to be captured is greater than an upper limit set for a second time value, the exposure time for the certain image to be captured may be set to the upper limit offset for the second time value, i.e., 5.5 s.

As an example, when an upper limit of the exposure time is set as 5 s. When the exposure time for an image to be captured is greater than the upper limit, the exposure time may be set to the upper limit, and the photo-sensibility may be increased accordingly. For example, according to the luminance information of the current capturing scene, it is determined that the base exposure time is 2 s and the base photo-sensibility is 100ISO, i.e., the current exposure value is EV0. When the exposure for the image to be captured is EV+2, the exposure time is 8 s and the photo-sensibility is 100ISO. Since the exposure time of 8 s is greater than the upper limit of 5 s, the exposure time corresponding to the exposure EV+2 may be set to equal to 5 s, and the ISO value may be determined as 8/5*100ISO, i.e., 160ISO. Therefore, by updating the exposure time of the image to be captured, the image brightness may be increased while ensuring required exposure, thereby avoiding an image distortion caused by overexposure when the exposure time is long.

As another possible implementation, when the exposure time for an image to be captured is less than a lower limit, the exposure time may be set to the lower limit. Since the exposure is a product of the photo-sensibility and the exposure time, the photo-sensibility may be updated based on the target exposure and the lower limit of the exposure time. The exposure time for the image to be captured less than the lower limit may be updated to the lower limit.

As an example, the lower limit of the exposure time is 150 ms. The preset photo-sensibility for each image to be captured is 100ISO. There are 4 images to be captured. The preset exposure compensation values EVs for the 4 images to be captured may be [−6, −5, −4, 0]. It is assumed that the EV0 corresponds to 100 ms and 100ISO, when the preset exposure compensation exposure value is EV−6, the exposure time for the image to be captured may be 100 ms, and the photo-sensibility may be 100ISO. Since the exposure time (100 ms) for the image to be captured is less than the exposure time (150 ms), the exposure time for the image to be captured is set to the lower limit (150 ms), and the photo-sensibility for the image to be captured is 100ISO. Therefore, the image brightness is increased by updating the exposure time for the image to be captured. The target exposure of the image is increased to 150 ms×100ISO from 100 ms×100ISO, which is 3/2 times larger than the exposure value before the update.

Further, in order to make the exposure transition smooth among each image to be captured, and make the darkness region and the highlight region expose appropriately, image brightness of other images may be increased synchronously. Referring to the above example, for the image corresponding to the EV−6, the target exposure is 3/2 times of that before the update, and the target exposure for other images are also 3/2 times of a respective exposure before the update. In detail, increasing the target exposure may be realized by increasing the exposure time or increasing the ISO, which is not limited herein.

At block 104, exposure control is performed based on the exposure time for each image to be captured and the photo-sensibility for each image to be captured.

In examples of the present disclosure, the exposure control may be performed by the imaging device based on the exposure time for each image to be captured and the photo-sensibility for each image to be captured to obtain a plurality of images. The plurality of images may be combined into a composite image.

With the exposure control method according to embodiments of the present disclosure, by detecting the light luminance to determine the target exposure for each image to be captured, by determining the exposure time for each image to be captured based on the target exposure for each image to be captured and the preset photo-sensibility for each image to be captured, and by updating the exposure time for at least one image to be captured based on the upper limit when the exposure time for at least one image to be captured is greater than the upper limit, the exposure control is performed based on the exposure time for each image to be captured and the photo-sensibility. The exposure time for each image to be captured may be determined according to the shake degree of the imaging device, and the exposure time for at least one image to be captured may be updated based on the upper limit, such that the exposure control is performed based on the finally updated exposure time and the photo-sensibility for each image to be captured, for imaging. Therefore, the dynamic range and the entire brightness of the captured image may be improved in the night mode, and the noise in the captured image may be effectively suppressed. Thus, the image quality of the captured image is increased, improving the user experience.

Figure 3:
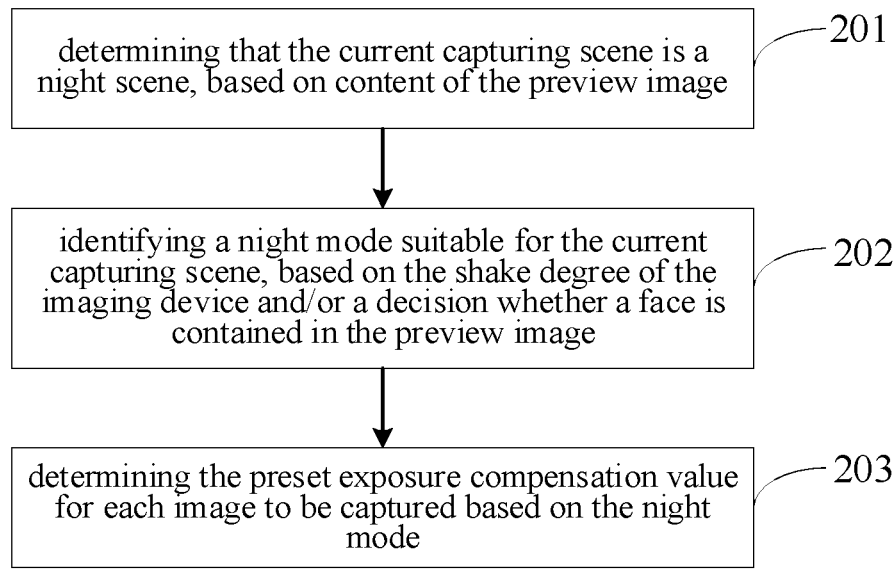
FIG. 3 is a schematic flowchart illustrating still another exposure control method according to embodiments of the present disclosure.

As a possible implementation, in the present disclosure, before the target exposure for each image to be captured is determined based on the base exposure and the preset exposure compensation value for each image to be captured, it is required to determine the preset exposure compensation value for each image to be captured. As illustrated in FIG. 3, the method may further include the following.

At block 201, it is determined that the current capturing scene is a night scene based on content of a preview image.

In examples of the present disclosure, the preview image of the current capturing scene may be obtained by the imaging device, to determine whether the current capturing scene is the night scene.

In detail, the light luminance value depends on the capturing scene. In addition, the content of the preview image depends on the capturing scene. It may be determined whether the current capturing scene is the night scene based on the content of the preview image of the current capturing scene and the ambient light luminance value corresponding to each part of the preview image.

For example, the content of the preview image contains a night sky or a light source, or the ambient light luminance value corresponding to each part of the preview image satisfies a brightness distribution feature of the image in the night scene, it may be determined that the current capturing scene is the night scene.

At block 202, a night mode suitable to the current capturing scene is identified based on the shake degree of the imaging device and/or a decision whether a face is contained in the preview image.

In examples of the present disclosure, the displacement information of the imaging device during the capturing may be collected by the displacement sensor provided in the imaging device, and the current shake degree of the imaging device may be determined based on the displacement information. Therefore, based on the shake degree of the imaging device, it may be determined whether the imaging device is fixed on a tripod or held by hands. Therefore, based on the current shake degree of the imaging device, the night mode suitable for the current capturing scene may be identified. The night mode may include a tripod mode or hand-held mode.

As an example, the current shake degree of the imaging device may be determined by obtaining information from a gyro-sensor of an electronic device.

The gyro-sensor is also called as an angular velocity sensor, configured to measure the angular velocity of rotation of an object when the object is deflected or inclined. In the imaging device, the gyro-sensor may be configured to measure the rotation and deflection, such that an actual motion of the user may be accurately analyzed. The information (gyro information) from the gyro-sensor of the electronic device may include motion information of the imaging device in three dimensions in a three-dimensional space. The three dimensions of the three-dimensional space may be represented as three directions of an X-axis, a Y-axis, and a Z-axis. Every two of the X axis, the Y axis and the Z axis are perpendicular to each other.

Therefore, in embodiments of the present disclosure, the present shake degree of the imaging device may be determined according to the present gyro information of the electronic device. When absolute values of the gyro monitions of the electronic device in the three dimensions are large, it may be determined that the shake degree of the imaging device is large. In detail, thresholds of the absolute values may be set in advance for the gyro monition in the three dimensions. The current shake degree of the imaging device may be obtained based on a relationship between a sum of the absolute values of the present gyro monitions in the three dimensions and the preset thresholds.

For example, the preset thresholds may be a first threshold A, a second threshold B and a third threshold C, where A<B<C. The sum of the absolute values of the gyro monitions in the three directions is S. When S<A, it may be determined that the present shake degree of the imaging device is "no shake". When A<S<B, it may be determined that the present shake degree of the imaging device is "slight shake". When B<S<C, it may be determined that the present shake degree of the imaging device is "little shake". When S>C, it may be determined that the present shake degree of the imaging device is "serious shake".

It should be explained that, the above descriptions are merely exemplary, and not construed as limitation of the present disclosure. In actual usages, a mapping relationship between the gyro information and the shake degree of the imaging device may be set in advance based on a preset threshold actually required and specific values of various thresholds, and a relationship between the gyro information and various thresholds.

As another possible implementation, by determining whether the face is contained in the preview image of the imaging device, the night mode suitable for the current capturing scene may be identified.

In examples of the present disclosure, it may be determined whether the face is contained in the preview image via a face recognition technology. The face recognition technology is to verify identity of a user by analyzing and comparing facial visual features. The face recognition technology is a biometric recognition technology, used to distinguish biological individuals based on biological features of each biological individual (generally a person). At present, the face recognition technology is already used for various fields. For example, the face recognition technology may be used in face auto focusing of a digital camera and smile shutter technology, enterprise and housing safety and management, access control system, video surveillance system, and the like. General face recognition algorithm includes a feature-based recognition algorithm, an appearance-based recognition algorithm, a template-based recognition algorithm, a recognition algorithm using neural network, or the like.

It should be explained that, when it is detected that the face is contained in the preview image, a light detecting module of the imaging device may automatically detect the light luminance within a region, e.g., mainly a face region. The base exposure may be determined based on a result of detecting the light luminance within the face region. However, in the night scene, the light luminance of the face region is low, such that the base exposure determined is higher than the base exposure determined when no face is contained. When the face is contained, too much overexposed images are captured, resulting in that the face region is overexposed and the imaging effect of capturing the image is poor. Therefore, for a same shake degree, the night mode suitable for a case that the face is contained in the preview image is different from the night mode suitable for a case that no face is contained in the preview image.

At block 203, the preset exposure compensation value for each image to be captured may be determined based on the night mode.

As a possible implementation, when the shake degree of the imaging device is different, the night mode suitable for the current capturing scene is different. Therefore, the preset exposure compensation value determined for each image to be captured is different accordingly. In examples of the present disclosure, the mapping relationship between the shake degree of the imaging device and the exposure compensation value may be set in advance, such that the preset exposure compensation value for each image to be captured may be determined based on the shake degree of the imaging device.

For example, when the shake degree of the imaging device is "no shake", the exposure compensation value EV for each image to be captured ranges from −6 to 2 and a difference between two adjacent EV values is 0.5. When the shake degree of the imaging device is the "slight shake", the exposure compensation value EV for each image to be captured ranges from −5 to 1, and a difference between two adjacent EV values is 1.

As another possible implementation, it is detected whether the face is contained in the preview image. Depending on whether the face is contained in the preview image or not, the night mode suitable for the current capturing scene is different. Therefore, the preset exposure compensation value determined for each image to be captured is different.

As another possible implementation, for a same shake degree, a respective exposure compensation value may be determined for each image to be captured by determining whether the face is contained in the preview image. Therefore, a plurality of exposure compensation values may correspond to a same shake degree. For example, when the shake degree of the imaging device is the "slight shake", at least two preset exposure compensation values may be determined for each image to be captured in a case that the face is contained and a case that no face is contained.

In the night mode, when the face is contained in the image to be captured, the light luminance intensity of the face region is generally low, such that the base exposure determined is higher than the base exposure determined when no face is contained. When the face is contained, a plurality of overexposed images are captured, resulting in that the face region is easily overexposed. Therefore, the imaging effect of the captured image is poor, such that a corresponding exposure compensation mode needs to have a lower exposure compensation range. For the same shake degree, with the case that the face is contained in the preview image and the case that no face is contained in the preview image, the preset exposure compensation value in conformation to an actual case may be determined after the present shake degree of the imaging device is determined and after it is determined whether the face is contained in the preview image.

With the exposure control method according to the present disclosure, by acquiring the preview image and determining that the current capturing scene is the night scene based on the content of the preview image, the night mode suitable for the current capturing scene is identified based on the shake degree of the imaging device and/or a determination whether the face is contained in the preview image. Further, the preset exposure compensation value for each image to be captured may be determined based on the night mode. Base on the shake degree of the imaging device and/or the determination whether the face is contained in the preview image, the night mode of the current capturing scene may be determined, the preset exposure compensation value may be determined for each image to be captured, and the exposure time for each image to be captured may be determined. Based on the upper limit, the exposure time for at least one image to be captured may be updated. The exposure control may be performed for imaging based on the finally obtained exposure time and the finally obtained photo-sensibility for each image to be captured. The dynamic range and the entire brightness of the captured image may be improved in the night mode, and the noise of the captured image may be suppressed. Therefore, the image quality of the image captured in the night scene is increased, thereby improving user experience.

In order to achieve the above embodiments, the present disclosure further provides an exposure control device.

Figure 4:
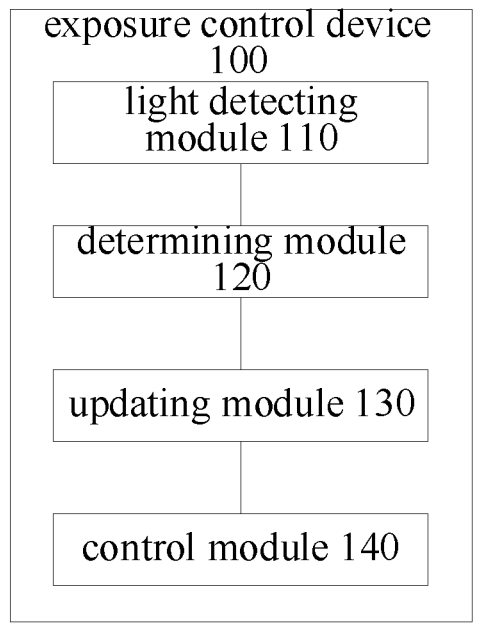
FIG. 4 is block diagram illustrating an exposure control device according to embodiments of the present disclosure.

FIG. 4 is a block diagram illustrating an exposure control device according to embodiments of the present disclosure.

As illustrated in FIG. 4, the exposure control device 100 may include a light detecting module 110, a determining module 120, an updating module 130 and a control module 140.

The light detecting module 110 is configured to determine a target exposure for an image to be captured based on ambient light luminance.

The determining module 120 is configured to determine an exposure time for the image to be captured based on the target exposure and a preset photo-sensibility for the image to be captured.

The updating module 130 is configured to, in response to determining that the exposure time for the image to be captured is greater than an upper limit, update the exposure time for the image to be captured based on the upper limit.

The control module 140 is configured to perform an exposure control based on the exposure time and the preset photo-sensibility for the image to be captured. In some examples, the light detecting module 110 may be configured to detect light luminance to determine a target exposure for each image to be captured. The determining module 120 may be configured to determine exposure time for each image to be captured based on the target exposure for each image to be captured and a photo-sensibility for each image to be captured. The updating module 130 may be configured to update the exposure time for at least one image to be captured based on an upper limit when the exposure time for the at least one image to be captured is greater than the upper limit. The control module 140 may be configured to perform an exposure control based on the exposure time for each image to be captured and the photo-sensibility for each image to be captured.

As another possible implementation, the exposure control device further includes a first determining module.

The first determining module is configured to determine a preset photo-sensibility for each image to be captured and the upper limit, based on the shake degree.

As another possible implementation, the first determining module is further configured to obtain displacement information collected by a sensor arranged on the imaging device; determine the shake degree of the imaging device based on the displacement information; determine that the preset photo-sensibility equals to a first photo-sensibility value and determine that the upper limit equals to a first time value in response to determining that the shake degree is greater than or equal to a shake threshold; and determine that the preset photo-sensibility equals to a second photo-sensibility value and determine that the upper limit equals to a second time value, in response to determining that the shake degree is less than the shake threshold. The first photo-sensibility value is greater than the second photo-sensibility value and the first time value is less than the second time value.

The first photo-sensibility value is a preset multiple of the second photo-sensibility value. The preset multiple is greater than or equal to 2. The second photo-sensibility value is a minimum photo-sensibility of the imaging device.

The first time value ranges from 150 milliseconds to 300 milliseconds and the second time value ranges from 4.5 seconds to 5.5 seconds.

As another possible implementation, the light detecting module 110 may be further configured to determine a base exposure based on brightness information of a preview image. The base exposure includes a base exposure time and a base photo-sensibility. In addition, the light detecting module 110 is further configured to determine the target exposure for each image to be captured based on the base exposure and a preset exposure compensation value for the respective image to be captured.

As another possible implementation, the light detecting module 110 further includes an obtaining unit, a first determining unit, an identifying module and a second determining unit.

The obtaining unit is configured to obtain a preview image.

The first determining unit is configured to determine that the current capturing scene is a night scene, based on content of the preview image.

The identifying unit is configured to identify a night mode suitable for the current capturing scene, based on the shake degree of the imaging device and/or a decision whether a face is contained in the preview image.

The second determining unit is configured to determine the preset exposure compensation value for each image to be captured based on the night mode.

As another possible implementation, the exposure control device 100 further includes a first updating module and a second updating module.

The first updating module is configured to, in response to determining that the exposure time of the image to be captured is less than a lower limit, update the photo-sensibility for the image to be captured based on the target exposure and the lower limit.

The second updating module is configured to, in response to determining that the exposure time of the image to be captured is less than a lower limit, update the exposure time for the image to be captured based on the lower limit.

In some examples, the first updating module may be configured to update the photo-sensibility for an image to be captured having an exposure time less than a lower limit, based on the target exposure for the image to be captured and the lower limit. The second updating module may be configured to update the exposure time for the image to be captured having the exposure time less than the lower limit, based on the image to be captured having the exposure time less than the lower limit.

With the exposure control device according to embodiments of the present disclosure, by detecting the light luminance to determine the target exposure for each image to be captured, by determining the exposure time for each image to be captured based on the target exposure for each image to be captured and the preset photo-sensibility for each image to be captured, and by updating the exposure time for at least one image to be captured based on an upper limit in response to determining that the exposure time for at least one image to be captured is greater than the upper limit, the exposure control is performed based on the exposure time for each image to be captured and the photo-sensibility. The exposure time for each image to be captured may be determined according to the shake degree of the imaging device, and the exposure time for at least one image to be captured may be updated based on the upper limit, such that the exposure control is performed based on the finally updated exposure time and the photo-sensibility for each image to be captured, for imaging. Therefore, the dynamic range and the entire brightness of the captured image may be improved in the night mode, and the noise in the captured image may be effectively suppressed. Thus, the image quality of the captured image is increased, improving the user experience.

It should be noted that the foregoing explanation of the embodiment of the exposure control method is also applicable to the exposure control device of the embodiment, which will not be repeated here.

In order to achieve the above embodiments, the present disclosure further provides one or more non-volatile computer readable storage medium having a computer executable instruction. When the computer executable instruction is executed by one or more processors, the one or more processors are configured to execute following.

A target exposure for an image to be captured is determined based on ambient light luminance.

An exposure time for the image to be captured is determined based on the target exposure and a preset photo-sensibility for the image to be captured.

In response to determining that the exposure time is greater than an upper limit, the exposure time for the image to be captured is updated based on the upper limit.

An exposure control is performed based on the exposure time and the preset photo-sensibility for the image to be captured.

In order to achieve the above embodiments, the present disclosure further provides an electronic device, including a memory and a processor. The memory is configured to store a computer readable instruction, when the computer readable instruction is executed by a processor, the exposure control method described above.

Figure 5:
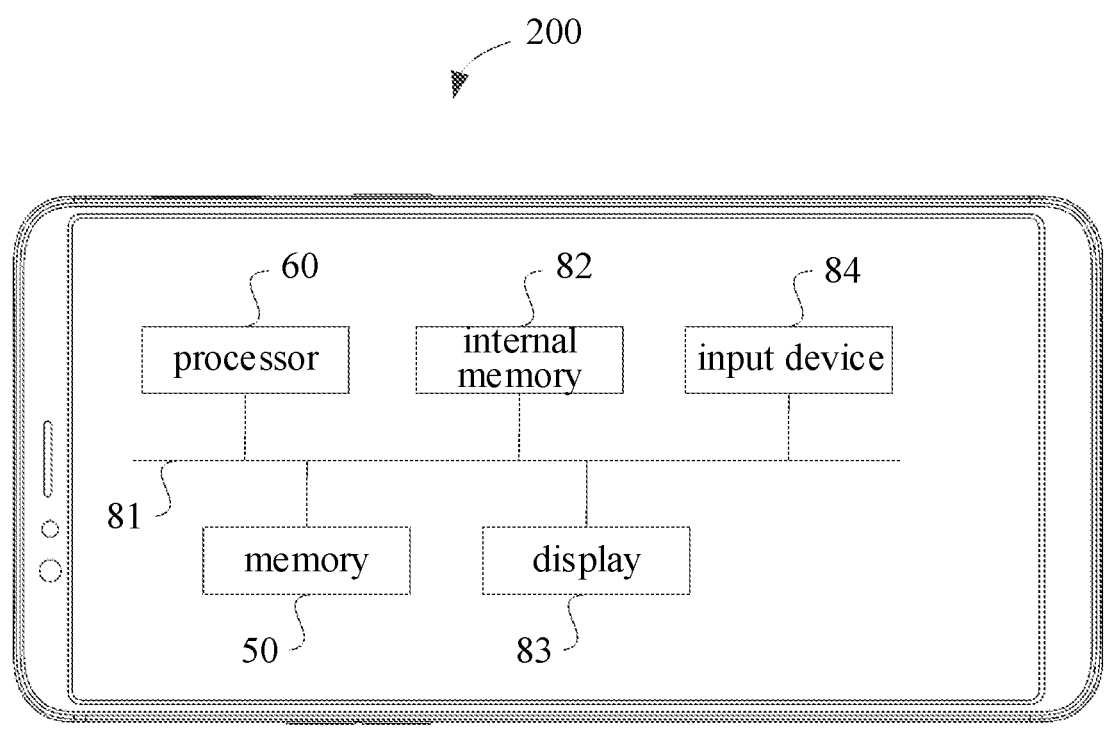
FIG. 5 is a block diagram illustrating an electronic device according to implementations of the present disclosure.

As illustrated in FIG. 5, embodiments of the present disclosure further provide an electronic device. The electronic device 200 includes a memory 50 and a processor 60. The memory 50 has computer readable instructions stored therein. When the computer readable instructions are executed by the processor 60, the processor 60 is configured to execute an exposure control method according to any one of the above implementations.

FIG. 5 is a schematic diagram illustrating an inner structure of an electronic device 200 according to embodiments of the present disclosure. the electronic device 200 includes a processor 60, a memory 50 (e.g., a non-volatile storage medium), an internal memory 82, a display 83 and an input device 84 connected via a system bus 81. The memory 50 of the electronic device 300 is configured to store an operation system and computer readable instructions. When the computer readable instructions are executed by the processor 60, the exposure control method according to embodiments of the present disclosure may be executed. The processor 60 is configured to provide a computation function and a control function, serving to support operations of a whole electronic device 200. The internal memory 50 of the electronic device 200 may provide an environment where the computer readable instructions of the memory 52 is running. The display 83 of the electronic device 200 may be a liquid crystal display or an E-ink display. The input device 84 may be a touchable layer covered on the display 83, or may be a key, a trace ball or a touchable panel arranged on a housing of the electronic device 200, or may be an external keyboard, a touchable panel or a mouse. The electronic device 200 may be a phone, a tablet computer, a personal digital assistance, or a wearable device (such as a smart wristband, a smart watch, a smart helmet, smart glasses or the like). It may be understood by those skilled in the art, the structure illustrated as FIG. 5 is merely a block diagram illustrating partial structure related to a technical solution of the present disclosure, but is not construed to limit the electronic device 200 to which the technical solution of the present disclosure is applied. In detail, the electronic device 200 may include less or more components, a combination of some components or different component arrangements illustrated in drawings.

Figure 6:
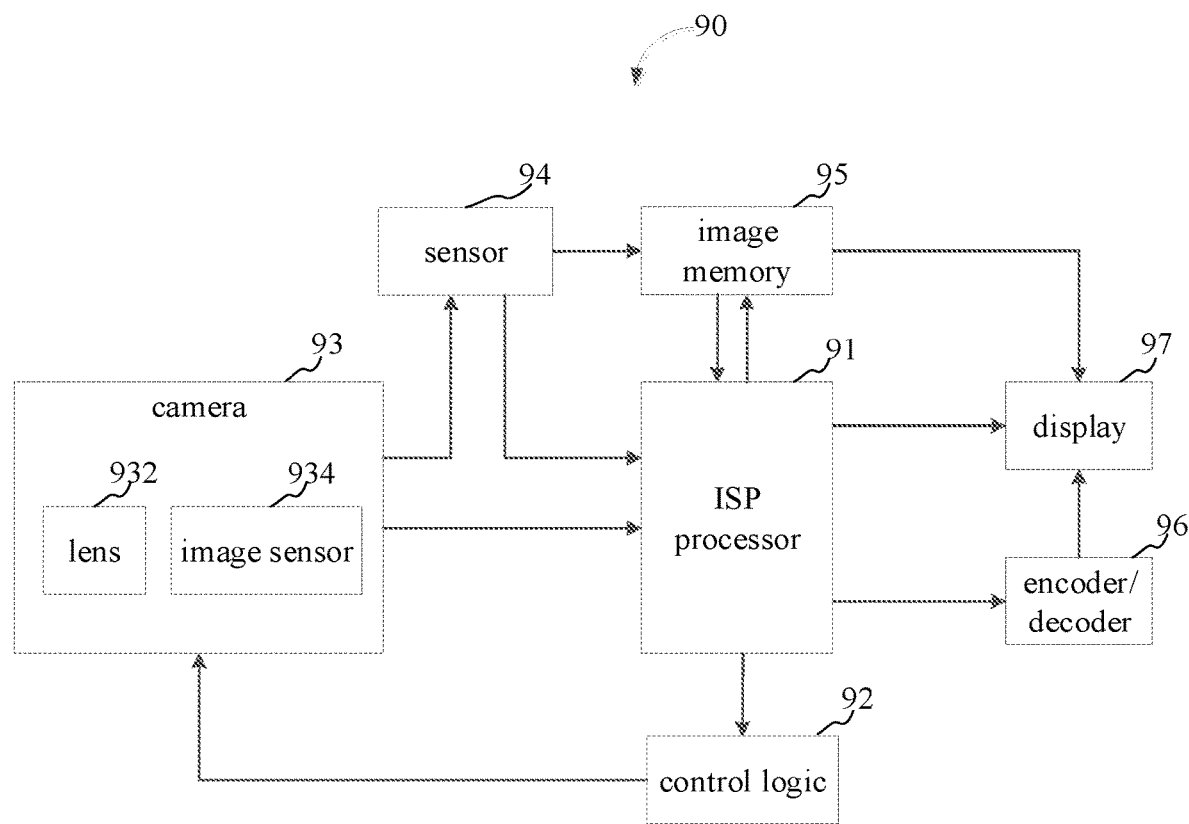
FIG. 6 is a schematic diagram illustrating an image processing circuit according to implementations of the present disclosure.

As illustrated in FIG. 6, the electronic device 200 according to embodiments of the present application includes an image processing circuit 90. The image processing circuit 90 can be implemented by using hardware and/or software components, including various processing units defining an ISP (image signal processing) line. FIG. 6 is a schematic diagram illustrating an image processing circuit 90 according to embodiments of the present disclosure. As illustrated in FIG. 6, for convenience of explanation, only various aspects of the image processing technique related to embodiments of the present application are shown.

As illustrated in FIG. 6, image processing circuit 90 includes an ISP processor 91 (ISP processor 91 can be the processor 60) and a control logic 92. Image data collected by a camera 93 is processed by the ISP processor 91. The ISP processor 91 is configured to analyze the image data to obtain image statistical information of one or more control parameters for controlling the camera 93. The camera 93 may include one or more lenses 932 and an image sensor

934. The image sensor 934 may include a color filter array (such as a Bayer filter). The image sensor 934 may be configured to capture light intensity and wavelength information captured by each imaging pixel and provide a set of raw image data that may be processed by ISP processor 91. A sensor 94, such as a gyroscope, can provide acquired parameters of image processing (such as anti-shake parameter) to the ISP processor 91 based on a type of the interface of the sensor 94. The interface of the sensor 94 can be a SMIA (standard mobile imaging architecture) interface, other serial or parallel camera interface, or a combination of the above.

In addition, the image sensor 934 may also transmit the raw image data to sensor 94, and the sensor 94 may provide raw image data to ISP processor 91 based on the type of the interface of the sensor 94, or the sensor 94 may store the raw image data into an image memory 95.

The ISP processor 91 processes the raw image data pixel by pixel in various formats. For example, each image pixel may have a bit depth of 8, 10, 12, or 14 bits, and the ISP processor 91 may perform one or more image processing operations on the raw image data, to collect the statistical information of the image data. The image processing operations can be performed with the same or different bit depth precision.

The ISP processor 91 can also receive image data from the image memory 95. For example, the raw image data to may be transmitted to the image memory 95 via the interface of the sensor 94. The raw image data in the image memory 95 may be provided to the ISP processor 91 for processing. The image memory 95 may be a memory 50, a portion of the memory 50, a storage device, or a separate dedicated memory within an electronic device, and may include features of DMA (direct memory access).

When receiving the raw image data from the interface of image sensor 934 or from the interface of the sensor 94 or from the image memory 95, the ISP processor 91 can perform one or more image processing operations, such as time domain filtering. The processed image data can be sent to the image memory 95 for additional processing before being displayed. The ISP processor 91 receives the processed data from the image memory 95 and performs image data processing in the original domain and in the RGB (red-green-blue) and YCbCr color spaces on the processed data. The image data processed by the ISP processor 91 can be output to the display 97 (the display 97 can include the display screen 83) for viewing by the user and/or further processed by a graphics engine or a GPU (graphics processing unit). Further, the output of the ISP processor 91 can also be sent to the image memory 95, and the display 97 can read image data from the image memory 95. In one embodiment, the image memory 95 can be configured to implement one or more image buffers. Additionally, the output of ISP processor 91 can be sent to an encoder/decoder 96 for encoding/decoding image data. The encoded image data can be saved and decompressed before being displayed on the display 97. The encoder/decoder 96 may be implemented by a CPU or GPU or coprocessor.

The statistical information determined by the ISP processor 91 can be sent to the control logic 92. For example, the statistical information may include the statistical information of the image sensor 934, such as auto exposure, auto white balance, auto focus, flicker detection, black level compensation, lens 932 shading correction, and the like. The control logic 92 may include a processing element and/or a microcontroller that execute one or more routines (such as firmware). The one or more routines may determine control parameters of the camera 93 and control parameters of the ISP processor based on received statistical information. For example, the control parameters of the camera 93 may include control parameters (e.g., gain, integration time for exposure control, anti-shake parameters, etc.) of the sensor 94, control parameters of camera flash, control parameters (e.g., focal length or zooming focal length) of lens 932, or a combination of the above parameters. The control parameters of the ISP may include gain levels and color correction matrices for automatic white balance and color adjustment (e.g., during RGB processing), as well as lens 932 shading correction parameters.

The followings are blocks of the exposure control method using the image processing technique of FIG. 6.

A target exposure for an image to be captured is determined based on ambient light luminance.

An exposure time for the image to be captured is determined based on the target exposure and a preset photo-sensibility for the image to be captured.

In response to determining that the exposure time is greater than an upper limit, the exposure time for the image to be captured is updated based on the upper limit.

An exposure control is performed based on the exposure time and the preset photo-sensibility for the image to be captured.

Those skilled in the art may understand that all or part of the process of implementing the above embodiments can be completed by a computer program to instruct related hardware, and the program can be stored in a non-volatile computer readable storage medium. When the program is executed, the flow of an embodiment of the methods as described above may be included. The storage medium may be a magnetic disk, an optical disk, a read-only memory (ROM), or the like.

The above-mentioned embodiments are merely illustrative of several embodiments of the present disclosure, and the description thereof is specific and detailed, which is not to be construed as limiting the scope of the present disclosure. It should be noted that multiple variations and modifications may be made by those skilled in the art without departing from the spirit and scope of the present disclosure. Therefore, the scope of protection of the present disclosure shall be subject to the appended claims.

What is claimed is:

1. A method for exposure control, comprising:
    determining a first exposure compensation value based on a shake degree of an imaging device according to a mapping relationship between the shake degree of the imaging device and an exposure compensation value;
    determining a second exposure compensation value by adjusting the first exposure compensation value depending on a decision of whether a face is contained in a preview of an image to be captured, wherein the second exposure compensation value when a face is contained is lower than the second exposure compensation value when no face is contained;
    determining a target exposure for an image to be captured based on a base exposure and the second exposure compensation value;
    determining an exposure time for the image to be captured based on the target exposure and a photo-sensibility for the image to be captured;
    in response to determining that the exposure time for the image to be captured is greater than an upper limit, updating the exposure time for the image to be captured based on the upper limit; and performing an exposure control based on the exposure time and the photo-sensibility for the image to be captured.

2. The method of claim 1, further comprising:
determining, based on a shake degree, the photo-sensibility for the image to be captured and the upper limit.

3. The method of claim 2, wherein determining, based on the shake degree, the photo-sensibility for the image to be captured and the upper limit comprises:
obtaining displacement information collected by a sensor arranged on an imaging device;
determining the shake degree of the imaging device based on the displacement information;
in response to determining that the shake degree is greater than or equal to a shake threshold, determining that the photo-sensibility equals to a first photo-sensibility value and determining that the upper limit equals to a first time value; and
in response to determining that the shake degree is less than the shake threshold, determining that the photo-sensibility equals to a second photo-sensibility value and determining that the upper limit equals to a second time value, the first photo-sensibility value being greater than the second photo-sensibility value, and the first time value being less than the second time value.

4. The method of claim 3, wherein,
the first photo-sensibility value is a multiple of the second photo-sensibility value, the multiple is greater than or equal to 2; and
the second photo-sensibility value is a minimum photo-sensibility of the imaging device.

5. The method of claim 3, wherein the first time value and the second time value are determined based on the ambient light luminance;
the first time value ranges from 150 milliseconds to 300 milliseconds; and
the second time value ranges from 4.5 seconds to 5.5 seconds.

6. The method of claim 1, further comprising:
determining whether a current capturing scene is a night scene, based on the preview of the image to be captured; and
in response to determining that the current capturing scene is the night scene, identifying a night mode suitable for the current capturing scene, based on the shake degree or the decision whether a face is contained in the preview of the image to be captured.

7. The method of claim 6, wherein determining whether the current capturing scene is the night scene, based on the preview of the image to be captured comprises:
determining the current capturing scene is the night scene in response to determining that a brightness distribution of the preview of the image to be captured satisfies a preset brightness distribution corresponding to the night scene.

8. The method of claim 1, further comprising:
in response to determining that the exposure time of the image to be captured is less than a lower limit, updating the photo-sensibility for the image to be captured based on the target exposure and the lower limit, and updating the exposure time for the image to be captured based on the lower limit.

9. A non-transitory computer readable storage medium having a computer executable instruction, wherein when the computer executable instruction is executed by one or more processors, the one or more processors are configured to execute an exposure control method, wherein the exposure control method comprises:
determining a first exposure compensation value based on a shake degree of an imaging device according to a mapping relationship between the shake degree of the imaging device and an exposure compensation value;
determining a second exposure compensation value by adjusting the first exposure compensation value depending on a decision of whether a face is contained in a preview of an image to be captured, wherein the second exposure compensation value when a face is contained is lower than the second exposure compensation value when no face is contained;
determining a target exposure for an image to be captured based on a base exposure and the second exposure compensation value;
determining an exposure time for the image to be captured based on the target exposure and a photo-sensibility for the image to be captured;
in response to determining that the exposure time for the image to be captured is greater than an upper limit, updating the exposure time for the image to be captured based on the upper limit; and
performing an exposure control based on the exposure time and the photo-sensibility for the image to be captured.

10. An electronic device, comprising a memory and a processor, wherein the memory is configured to store a computer readable instruction, when the computer readable instruction is executed by a processor, the processor is configured to:
determine a first exposure compensation value based on a shake degree of an imaging device according to a mapping relationship between the shake degree of the imaging device and an exposure compensation value;
determine a second exposure compensation value by adjusting the first exposure compensation value depending on a decision of whether a face is contained in a preview of an image to be captured, wherein the second exposure compensation value when a face is contained is lower than the second exposure compensation value when no face is contained;
determine a target exposure for an image to be captured based on a base exposure and the second exposure compensation value;
determine an exposure time for the image to be captured based on the target exposure and a photo-sensibility for the image to be captured;
in response to determining that the exposure time for the image to be captured is greater than an upper limit, update the exposure time for the image to be captured based on the upper limit; and
perform an exposure control based on the exposure time and the photo-sensibility for the image to be captured.

11. The electronic device of claim 10, wherein the processor is further configured to:
determine, based on a shake degree, the photo-sensibility for the image to be captured and the upper limit.

12. The electronic device of claim 11, wherein the processor is configured to determine, based on the shake degree, the photo-sensibility and the upper limit by:
obtaining displacement information collected by a sensor arranged on an imaging device;
determining the shake degree of the imaging device based on the displacement information;

in response to determining that the shake degree is greater than or equal to a shake threshold, determining that the photo-sensibility equals to a first photo-sensibility value and determining that the upper limit equals to a first time value; and in response to determining that the shake degree is less than the shake threshold, determining that the photo-sensibility equals to a second photo-sensibility value and determining that the upper limit equals to a second time value, the first photo-sensibility value being greater than the second photo-sensibility value, and the first time value being less than the second time value.

13. The electronic device of claim 12, wherein, the first photo-sensibility value is a multiple of the second photo-sensibility value, the multiple is greater than or equal to 2; and the second photo-sensibility value is a minimum photo-sensibility of the imaging device.

14. The electronic device of claim 12, wherein the first time value and the second time value are determined based on the ambient light luminance;

the first time value ranges from 150 milliseconds to 300 milliseconds; and the second time value ranges from 4.5 seconds to 5.5 seconds.

15. The electronic device of claim 10, wherein the processor is further configured to:

determine whether a current capturing scene is a night scene, based on the preview of the image to be captured; and in response to determining that the current capturing scene is the night scene, identify a night mode suitable for the current capturing scene, based on the shake degree of an imaging device or the decision whether a face is contained in the preview of the image to be captured.

16. The electronic device of claim 15, wherein the processor is configured to determine whether the current capturing scene is the night scene, based on the preview of the image to be captured by:

determining the current capturing scene is the night scene in response to determining that a brightness distribution of the preview of the image to be captured satisfies a preset brightness distribution corresponding to the night scene.

17. The electronic device of claim 10, wherein the processor is further configured to:

in response to determining that the exposure time of the image to be captured is less than a lower limit, update the photo-sensibility for the image to be captured based on the target exposure for the image to be captured and the lower limit and update the exposure time for the image to be captured based on the lower limit.

* * * * *